Patented Mar. 31, 1931

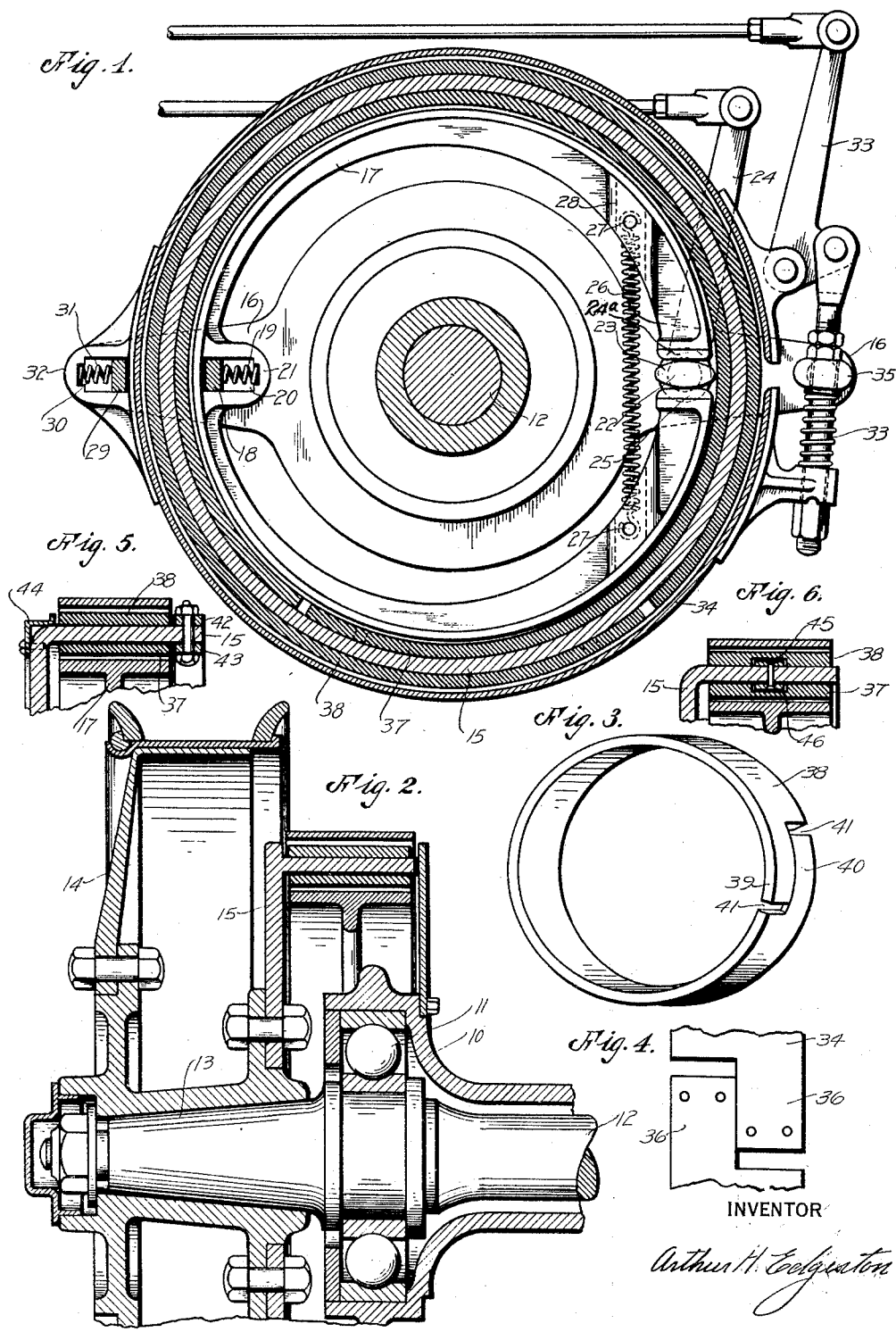

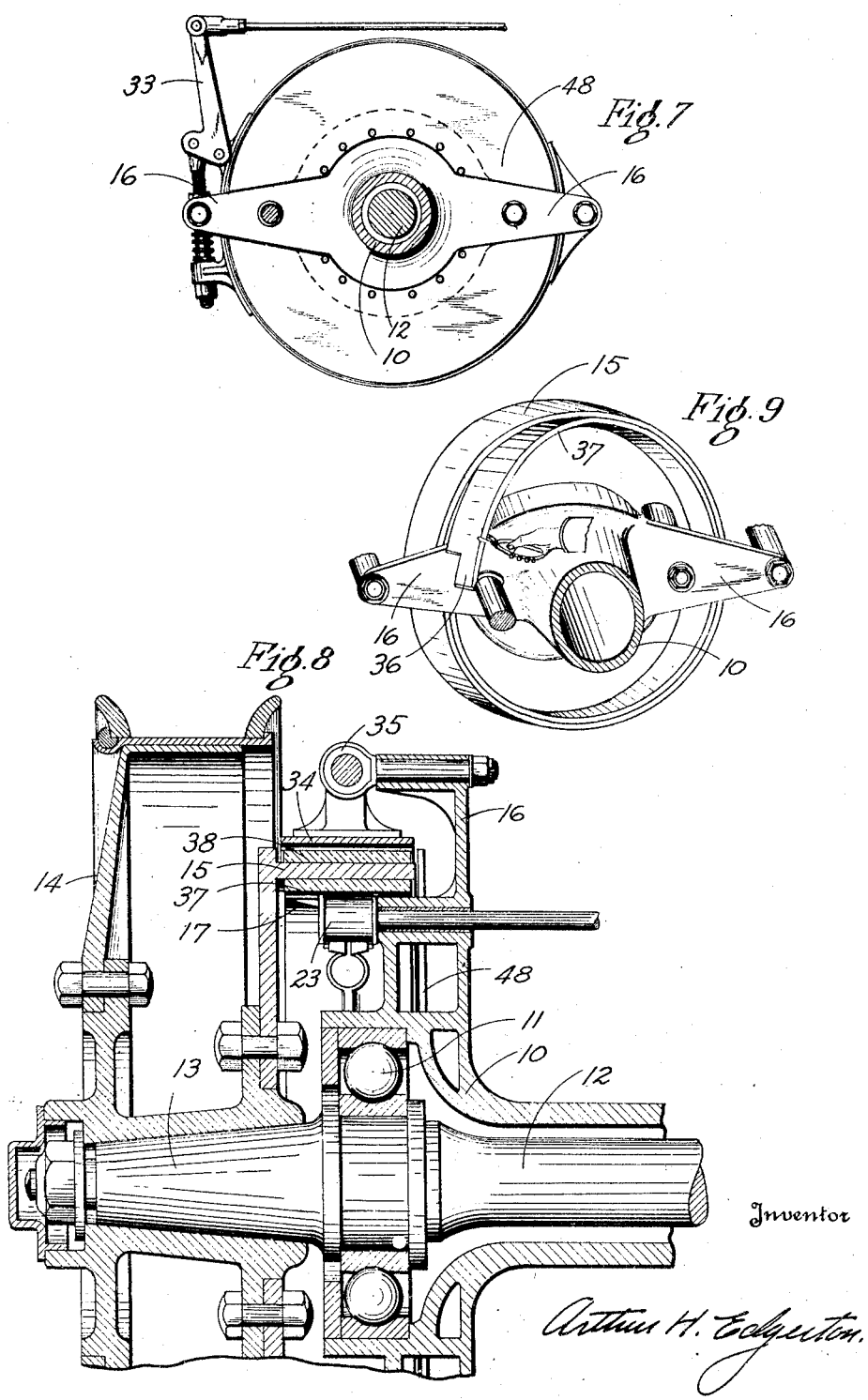

1,798,933

UNITED STATES PATENT OFFICE

ARTHUR H. EDGERTON, OF LAKEWOOD, OHIO, ASSIGNOR TO THE WHITE MOTOR COMPANY, OF CLEVELAND, OHIO, A CORPORATION OF OHIO

BRAKE MECHANISM

Application filed February 14, 1927. Serial No. 168,081.

My invention relates to improvements in brake mechanisms and more particularly to improvements in such braking mechanisms as are commonly employed in motor vehicles or for analogous purposes.

In my co-pending application, Serial No. 9,225, filed February 14, 1925, and entitled Brake mechanisms, a vehicular brake is disclosed that comprises an organization of braking elements associated with a non-continuous resilient floating ring faced with suitable brake lining and supported either by the vehicle brake drum or the brake shoes and their appurtenances.

My present invention contemplates a braking mechanism that embodies, in addition to certain basic features in the construction disclosed in the aforesaid application, an improved friction strip which comprises a homogeneous annulus of a resilient character which may be so formed as to be sprung upon either the brake shoes or brake drum and be supported thereby.

The invention is further directed toward providing lateral retention mechanisms which may be applied to a vehicle already in use which has not been designed primarily to support a floating friction member or retain it in relative alignment with the brake drum and shoes.

Another object of my invention is to provide as an article of manufacture a removable homogeneous wear piece for braking mechanisms of automotive vehicles.

Other objects and advantages reside in the specific construction and assemblage of elements peculiar to my structure as will become apparent from a more complete examination of this specification, in the claims of which I have assembled and pointed out certain combinations of parts and specific constructions indicative of the scope and spirit of the invention.

In the drawings which illustrate a preferred embodiment of the invention:

Figure 1 is a view partly in elevation and partly in vertical section showing so much of the brake operating mechanism as is necessary for an understanding thereof.

Figure 2 is a vertical section through a vehicle wheel and the braking mechanism of the type illustrated in Figure 1.

Figure 3 is a perspective view of the friction element embodied in my invention.

Figure 4 is a detail view in elevation of a fragmentary portion of the terminating ends of an external brake band, the structure being an alterative form of that shown in Figure 1.

Figure 5 is a vertical section through the upper portion of a brake drum illustrating a modification of the construction in Figure 2 for retaining the friction element.

Figure 6 is a vertical section through the upper portion of a brake drum illustrating a further modification of the friction element retention structure.

Fig. 7 is a sectional view illustrating the arrangement and formation of the arms which supports the brake actuating mechanism.

Fig. 8 is a horizontal sectional view illustrating the brake actuating mechanism supports.

Fig. 9 is a view in perspective illustrating somewhat diagrammatically the manner in which one of the braking elements may be withdrawn from the assemblage.

Referring to the drawings in which like symbols designate corresponding parts, in each of the several views the brake structure chosen to illustrate the invention is associated with the rear driving gear of a motor vehicle, and comprises a rear axle housing 10, in which there is journaled an anti-friction bearing 11, supporting a driving shaft 12, upon the spindle 13, in which there is mounted a vehicle wheel 14, having a brake drum 15, secured thereto in the usual manner.

In the present case, the axle housing 10, comprises a pair of diametrically opposite arms 16, which are adapted to support an internal expanding braking mechanism and an external contracting or band type brake. The internal brake embodies a resilient non-continuous brake shoe 17 slidingly supported upon a post 18 which is rigidly affixed upon one of the arms 16, and radially yieldingly supported thereupon by a retractile spring 19, interposed between the post 18, and the inner end of a slot 20, formed in a boss 21, on the inner portion of the brake shoe 17.

The opposite arm 16, supports a brake cam shaft 22, to which there is secured the brake cam 23, and suitable actuating linkage 24. The brake cam 23, is interposed between the free ends of the brake shoe and is adapted in the present case to bear against hardened wear plates 24ª, the corners of which are preferably rounded to facilitate the ready rotative movement of the contiguous friction element. The ends of the brake shoe 17, are held in engagement with the cam 23, by a contractile spring 26, anchored on pins 27, within apertured bosses 28, near the free ends of the brake shoe.

The external contracting brake is likewise anchored on a fixed post 29, carried by one of the arms 16, and is also radially yieldingly supported thereupon by a retractile spring 30, interposed between the post 29 and the end of a slot 31, formed in the bracket 32, which is secured to the external brake band.

The contracting brake is actuated through linkage 33, suitably affixed to the free ends of the external brake band 34, and anchored on a post 35, supported by one of the arms 16. The free ends of the brake band 34, are slightly rounded or may be constructed with extended contiguous portions 36, substantially as illustrated in Figure 4, which prevent the terminating ends of the brake band from holding the friction member and arresting the free rotative movement of the same during the application of the brake.

The body portion of the rear axle 10, shown in Figures 1 and 2 of the drawing, and the specific type of external and internal braking mechanism, are merely illustrative of the complete type of a vehicular brake and form, per se, no part of the present invention except as to the configuration of the terminating ends of the brake band and brake shoes which, as described, are so formed as to permit the relative rotative movement of the friction element.

Intermediate the brake drum 15, and the internal brake shoe 17, a friction member 37, is interposed being supported in the instant case by its frictional engagement with the inner face of the brake drum. The friction member herein shown is formed of a homogeneous strip of resilient material, any resilient material may be used but phenolic or a like material is preferred. This member may be molded or rolled into a non-continuous ring slightly larger in its unsprung form than the brake drum or slightly smaller in its free unstressed condition than the brake shoe the ring being formed for deformation consonant with the desirability of the sustentation of the friction member upon the brake drum or shoe. As illustrated, a second friction member 38, is supported on the outer periphery of the brake drum 15, being retained thereon by its inherent resiliency. Both the friction members 37 and 38, may be formed with their free ends terminating in some suitable joint such for instance as illustrated in Figure 3, in which case the contiguous free ends 39 and 40, of the friction member, are laterally overlapped and suitably formed to permit contractive distortion of the friction member as through the slots 41.

As illustrated in Figure 5, the inner edge of the brake drum 15, is provided with a ring 42, secured to the outer periphery of the drum adjacent its edge and a ring 43, is bolted or otherwise secured to the inner periphery of the brake drum. The outer end of the brake drum is likewise provided with a retention ring 44, this ring being suitably flanged to facilitate a convenient connection upon the brake drum.

The friction members 37 and 38 may also be laterally retained by rings such as 45 and 46, rigidly connected to the brake drum 15, and co-ordinated with circumferential grooves in the inner and outer peripheries of the friction members as illustrated in Figure 6.

By virtue of the friction members being supported in resilient engagement either with the rotatable brake drum or with the fixed brake elements, suitable clearances may be maintained between the rotative and fixed brake members during non-braking periods.

Upon the application of either the internal or external brake, the brake shoe or brake band will contact with the friction member and cause it to be impinged between the brake drum and the actuated brake member. Since the friction member is unattached to either the brake shoe or brake drum, the first increment of frictional resistance will be between the friction member and the brake element which is provided with running clearance. Following this engaging action of the brake shoe, slippage will occur between either the frictional member and the brake drum or the brake shoe or both, depending upon the condition of the friction member engaging surface.

When the friction members 37 and 38 or either of them become worn and it is desired to replace the same the rings 42 and 43 or the plate 48 may first be removed then with the use of a suitable tool one of the free ends of the friction member may be withdrawn from the space between the brake drum and adjacent brake shoe and twisted over one of the arms as illustrated in Figure 9. By working the friction member outwardly and at the same time drawing the end of the ring circumferentially about the arm 16 the member will be twisted to a position which will afford its release from the opposite arm and the ring may then be sprung over the axle. Obviously the insertion of a new friction element may be effectuated by the reversal of this operation.

Although the foregoing description is necessarily of a detailed character, in order that the invention may be completely set forth, it is to be understood that the specific terminology is not intended to be restrictive or confining, and that various rearrangement of parts and modifications of structural detail may be resorted to without departing from the scope or spirit of the invention as herein claimed.

What I claim is:

1. In a vehicle brake mechanism, the combination with a rotatable brake drum, an expanding mechanism and an external contracting mechanism disposed adjacent the inner and outer surfaces, respectively, of the brake drum, of a pair of inherently resilient friction elements in the form of rings broken at one point, one of said friction elements being normally formed to have a normal inside diameter less than the outside diameter of the brake drum and sprung over the brake drum outer surface and clinging thereto by the power of its inherent resiliency, the other friction element being contracted from a normal form greater than the inside diameter of the brake drum and sprung within the brake drum and spring-pressed thereagainst by the power of its inherent resiliency tending to effect expansion thereof, said inner and outer mechanisms being normally spaced free from the said friction elements, and means operative to move the said mechanisms each into contact with its adjacent friction element to press the same against the brake drum, and means restraining said mechanisms from rotation.

2. In a brake mechanism, the combination with a pair of telescoped substantially cylindrical brake elements, one of which is stationary, and the other of which is rotatable, of an inherently resilient strip adapted for insertion between opposing surfaces of the elements and, by deformation from a normal form, adapted to cling in substantially ring form to one of said element opposing surfaces, one of said elements being in the form of a continuous ring, the other of said elements being in the form of a broken ring, the last said element having its ends disposed closely adjacent and rounded in portions disposed toward the friction element, said friction element having its ends formed so as to overlap when the strip is deformed to substantially ring form.

3. In a brake mechanism, the combination with a pair of telescoped spaced relatively rotatable brake elements having spaced braking surfaces, one of said elements being divided at at least one point to permit it to move its braking surface toward the braking surface of the other element, of a floatable friction element comprising a friction strip adapted for insertion between the said element surfaces, said strip being of inherently resilient substantially homogeneous friction material, and having overlapping circumferentially relatively movable end portions.

4. In a vehicle brake mechanism, the combination with a pair of concentric relatively rotatable elements, one of said elements being rotatable by a vehicular driving shaft, of a homogeneous inherently resilient friction piece interposed between and rotatable relative to both said elements, disposed normally out of contact with one of said elements and adhering to the other element by spring pressure effected by distorting the friction piece from its normal form, said other element restraining the return of the friction piece to normal form, said friction piece being in the form of a split ring and cyclicly movable relative to the said elements.

5. In a vehicle brake mechanism, the combination with a pair of concentric relatively rotatable elements, one of said elements being rotatable by a vehicular driving shaft, of a removable inherently resilient friction piece interposed between and rotatable relative to both said elements, disposed normally out of contact with one of said elements and adhering to the other element by spring pressure effected by distorting the friction piece from its normal form, said other element restraining the return of the friction piece to normal form, said friction piece being in the form of a split ring and movable circumferentially relative to the said elements, said ring and said other element being prevented from lateral movement by the projection of an annular rib of the one into an annular groove of the other.

6. In a brake mechanism, the combination with a brake drum, of an internally disposed expanding mechanism, an externally disposed contracting mechanism, said drum and said expanding and contracting mechanisms being formed with spaced braking surfaces, a resilient friction element inserted between the opposed braking surfaces of said expanding mechanism and said drum, capable of rotation with respect to both said expanding mechanism and said drum, and held in engagement with one of said last named braking surfaces by the power of its inherent resiliency after being deformed, and a second resilient friction element inserted between the braking surfaces of said contracting mechanism and said drum, capable of rotation with respect to both said contracting mechanism and said drum, and held in engagement with one of said last named braking surfaces by the power of its inherent resiliency after being deformed.

In testimony whereof I hereunto affix my signature this 12th day of February, 1927.

ARTHUR H. EDGERTON.